United States Patent
Kim et al.

(10) Patent No.: US 10,127,212 B1
(45) Date of Patent: Nov. 13, 2018

(54) CORRECTING ERRORS IN COPIED TEXT

(71) Applicant: GOOGLE INC., Mountain View, CA (US)

(72) Inventors: Harold H. W. Kim, Chippendale (AU); Alessandro Suraci, Zurich (CH); Nakul Kumar, Bangalore (IN); Pritam Pebam, Bangalore (IN); Tali Rosen Shoham, Raanana (IL); Arkady Zaifman, Tel Aviv (IL)

(73) Assignee: GOOGLE LLC, Mountain View, CA (US)

( * ) Notice: Subject to any disclaimer, the term of this patent is extended or adjusted under 35 U.S.C. 154(b) by 94 days.

(21) Appl. No.: 14/882,786

(22) Filed: Oct. 14, 2015

(51) Int. Cl.
G06F 17/24 (2006.01)
G06F 17/27 (2006.01)
G06F 3/0484 (2013.01)
G06F 17/22 (2006.01)

(52) U.S. Cl.
CPC .......... *G06F 17/24* (2013.01); *G06F 3/04847* (2013.01); *G06F 17/2282* (2013.01); *G06F 17/2765* (2013.01)

(58) Field of Classification Search
CPC ....... G06F 17/273; G06F 17/211; G06F 17/24
See application file for complete search history.

(56) References Cited

U.S. PATENT DOCUMENTS

| 5,070,478 A | 12/1991 | Abbott |
| 6,658,377 B1 | 12/2003 | Anward et al. |
| 7,127,704 B2 | 10/2006 | Van De Vanter et al. |
| 2002/0010726 A1* | 1/2002 | Rogson ................. G06F 17/273 715/257 |
| 2003/0125929 A1 | 7/2003 | Bergstraesser et al. |
| 2007/0030528 A1* | 2/2007 | Quaeler ................. G06F 17/24 358/453 |
| 2015/0046804 A1* | 2/2015 | Weksler ................. G06F 17/211 715/257 |

OTHER PUBLICATIONS

Birch et al., "CCG Supertags in Factored Statistical Machine Translation", Proceedings of the Second Workshop on Statistical Machine Translation, Jun. 2007, pp. 9-16.

(Continued)

*Primary Examiner* — Scott Baderman
*Assistant Examiner* — Seung Jung
(74) *Attorney, Agent, or Firm* — Brake Hughes Bellermann LLP

(57) ABSTRACT

A non-transitory computer-readable storage medium may include instructions stored thereon for propagating changes to copied text. When executed by at least one processor, the instructions may be configured to cause a computing system to at least present copied text within a user interface of the computing system, monitor the user interface for changes to the copied text, receive a change to the copied text, the change including replacing a first instance of a first word, within the copied text, with a first instance of a second word, and in response to receiving the change to the copied text, present a prompt to replace, within the copied text, a second instance of the first word with a second instance of the second word.

23 Claims, 14 Drawing Sheets

(56) References Cited

OTHER PUBLICATIONS

Bojar et al., "English-to-Czech Factored Machine Translation", Proceedings of the Second Workshop on Statistical Machine Translation, Jun. 2007, pp. 232-239.
Callison-Burch et al., "(Meta-) Evaluation of Machine Translation", Proceedings of the Second Workshop on Statistical Machine Translation, Jun. 2007, pp. 136-158.
Chen et al., "Multi-Engine Machine Translation with an Open-Source Decoder for Statistical Machine Translation", Proceedings of the Second Workshop on Statistical Machine Translation, Jun. 2007, pp. 193-196.
Civera et al., "Domain Adaptation in Statistical Machine Translation with Mixture Modelling", Proceedings of the Second Workshop on Statistical Machine Translation, Jun. 2007, pp. 177-180.
Costa-Jussa et al., "Analysis of Statistical and Morphological Classes to Generate Weighted Reordering Hypotheses on a Statistical Machine Translation system", Proceedings of the Second Workshop on Statistical Machine Translation, Jun. 2007, pp. 171-176.
Costa-Jussa et al., "Ngram-based Statistical Machine Translation Enhanced with Multiple Weighted Reordering Hypotheses", Proceedings of the Second Workshop on Statistical Machine Translation, Jun. 2007, pp. 167-170.
Dugast et al., "Statistical Post-Editing on SYSTRAN's Rule-Based Translation System", Proceedings of the Second Workshop on Statistical Machine Translation, Jun. 2007, pp. 220-223.
Dyer, Christopher J., "The 'Noisier Channel': Translation from Morphologically Complex Languages", Proceedings of the Second Workshop on Statistical Machine Translation, Jun. 2007, pp. 207-211.
Federico, Marcello, "Efficient Handling of N-gram Language Models for Statistical Machine Translation", Proceedings of the Second Workshop on Statistical Machine Translation, Jun. 2007, pp. 88-95.
Foster et al., "Mixture-Model Adaptation for SMT", Proceedings of the Second Workshop on Statistical Machine Translation, Jun. 2007, pp. 128-135.
Gimenez et al., "Context-aware Discriminative Phrase Selection for Statistical Machine Translation", Proceedings of the Second Workshop on Statistical Machine Translation, Jun. 2007, pp. 159-166.
Gimenez et al., "Linguistic Features for Automatic Evaluation of Heterogenous MT Systems", Proceedings of the Second Workshop on Statistical Machine Translation, Jun. 2007, pp. 256-264.
He, Xiaodong, "Using Word Dependent Transition Models in HMM based Word Alignment for Statistical Machine Translation", Proceedings of the Second Workshop on Statistical Machine Translation, Jun. 2007, pp. 80-87.
Holmqvist et al., "Getting to know Moses: Initial experiments on German—English factored translation", Proceedings of the Second Workshop on Statistical Machine Translation, Jun. 2007, pp. 181-184.
Kang et al., "PPChecker: Plagiarism Pattern Checker in Document Copy Detection", Research Gate, Conference Paper, Jan. 2006, 9 pages.
Kashani et al., "Integration of an Arabic Transliteration Module into a Statistical Machine Translation System", Proceedings of the Second Workshop on Statistical Machine Translation, Jun. 2007, pp. 17-24.
Koehn et al., "Experiments in Domain Adaptation for Statistical Machine Translation", Jun. 2007, pp. 224-227.
Lavie, Alon, et al., "Meteor: An Automatic Metric for MT Evaluation with High Levels of Correlation with Human Judgments", Proceedings of the Second Workshop on Statistical Machine Translation, Jun. 2007, pp. 228-231.
Madnani et al., "Using Paraphrases for Parameter Tuning in Statistical Machine Translation", Proceedings of the Second Workshop on Statistical Machine Translation, Jun. 2007, pp. 120-127.
Menezes et al., "Using Dependency Order Templates to Improve Generality in Translation", Proceedings of the Second Workshop on Statistical Machine Translation, Jun. 2007, pp. 1-8.
Mohit et al., "Localization of Difficult-to-Translate Phrases", Proceedings of the Second Workshop on Statistical Machine Translation, Jun. 2007, pp. 248-255.
Moore et al., "An Iteratively-Trained Segmentation-Free Phrase Translation Model for Statistical Machine Translation", Proceedings of the Second Workshop on Statistical Machine Translation, Jun. 2007, pp. 112-119.
Nakov et al., "UCB System Description for the WMT 2007 Shared Task", Proceedings of the Second Workshop on Statistical Machine Translation, Jun. 2007, pp. 212-215.
Nguyen et al., "Training Non-Parametric Features for Statistical Machine Translation", Proceedings of the Second Workshop on Statistical Machine Translation, Jun. 2007, pp. 72-79.
Oflazer et al., "Exploring Different Representational Units in English-to-Turkish Statistical Machine Translation", Proceedings of the Second Workshop on Statistical Machine Translation, Jun. 2007, pp. 25-32.
Owczarzak et al., "Labelled Dependencies in Machine Translation Evaluation", Proceedings of the Second Workshop on Statistical Machine Translation, Jun. 2007, pp. 104-111.
Paulik et al., "The ISL Phrase-Based MT System for the 2007 ACL Workshop on Statistical Machine Translation", Proceedings of the Second Workshop on Statistical Machine Translation, Jun. 2007, pp. 197-202.
Perez et al., "Speech-input Multi-target Machine Translation", Proceedings of the Second Workshop on Statistical Machine Translation, Jun. 2007, pp. 56-63.
Popovic et al., "Word Error Rates: Decomposition over POS Classes and Applications for Error Analysis", Proceedings of the Second Workshop on Statistical Machine Translation, Jun. 2007, pp. 48-55.
Schwenk, Holger, "Building a Statistical Machine Translation System for French using the Europarl Corpus", Proceedings of the Second Workshop on Statistical Machine Translation, Jun. 2007, pp. 189-192.
Simard et al., "Rule-based Translation With Statistical Phrase-based Post-editing", Proceedings of the Second Workshop on Statistical Machine Translation, Jun. 2007, pp. 203-206.
Sun et al., "Meta-Structure Transformation Model for Statistical Machine Translation", Proceedings of the Second Workshop on Statistical Machine Translation, Jun. 2007, pp. 64-71.
Ueffing et al., "NRC's PORTAGE system for WMT 2007", Proceedings of the Second Workshop on Statistical Machine Translation, Jun. 2007, pp. 185-188.
Vilar et al., "Can We Translate Letters?", Proceedings of the Second Workshop on Statistical Machine Translation, Jun. 2007, pp. 33-39.
Vilar et al., "Human Evaluation of Machine Translation Through Binary System Comparisons", Proceedings of the Second Workshop on Statistical Machine Translation, Jun. 2007, pp. 96-103.
Xiong et al., "A Dependency Treelet String Correspondence Model for Statistical Machine Translation", Proceedings of the Second Workshop on Statistical Machine Translation, Jun. 2007, pp. 40-47.
Ye et al., "Sentence Level Machine Translation Evaluation as a Ranking Problem: one step aside from BLEU", Proceedings of the Second Workshop on Statistical Machine Translation, Jun. 2007, pp. 240-247.
Zollmann et al., "The Syntax Augmented MT (SAMT) System for the Shared Task in the 2007 ACL Workshop on Statistical Machine Translation", Proceedings of the Second Workshop on Statistical Machine Translation, Jun. 2007, pp. 216-219.

* cited by examiner

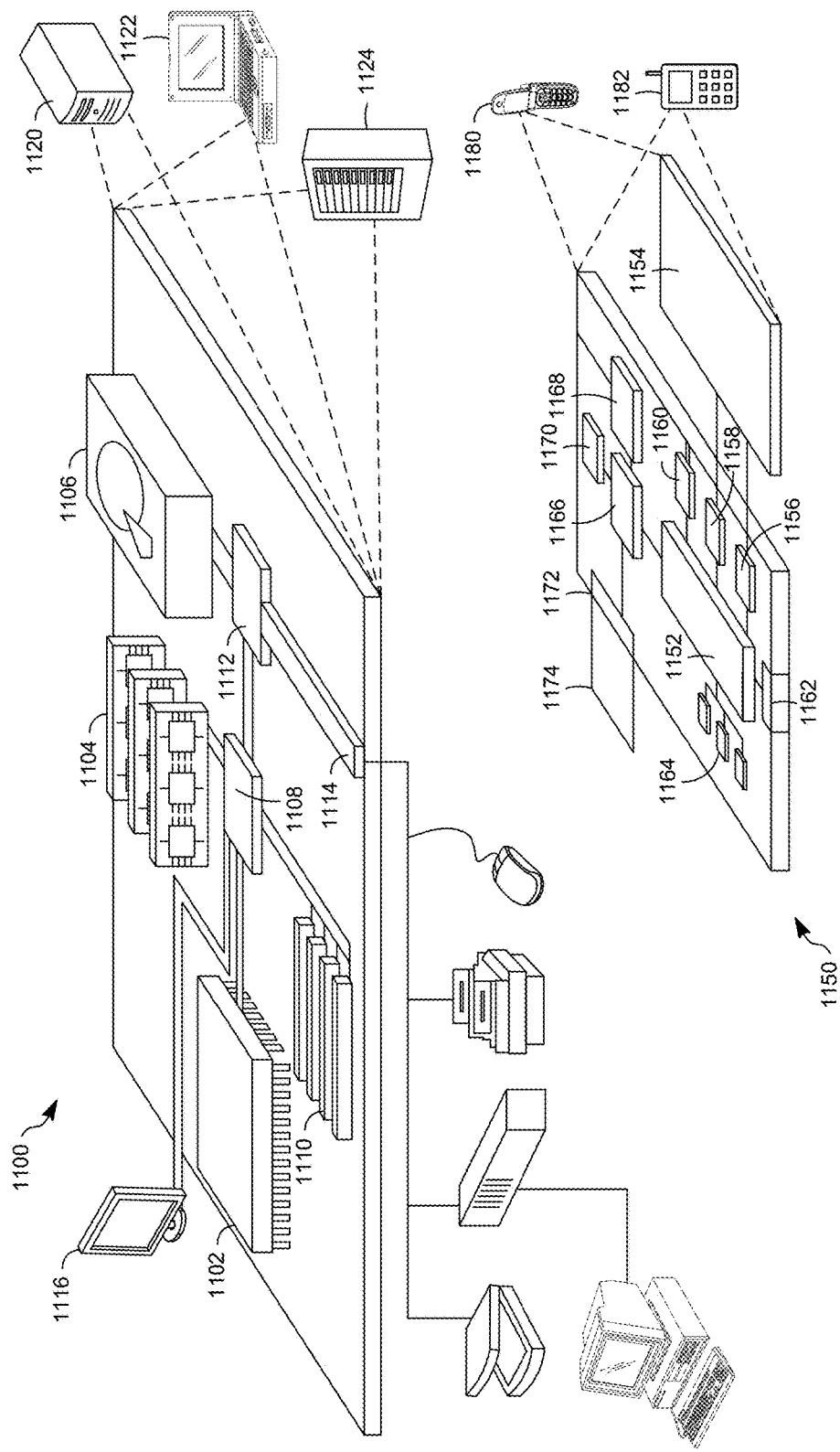

CORRECTING ERRORS IN COPIED TEXT

TECHNICAL FIELD

This description relates to correcting errors in text.

BACKGROUND

Computers may enable users to easily copy text, saving the user time by not requiring him or her to re-type the same text. Some parts of the text, such as the addressee, may change. A user may make one or more changes to the copied text, but forget to make corresponding changes throughout the copied text.

SUMMARY

Changes to copied text may be propagated to other parts of the copied text, such as by changing a name throughout the text after a name was changed, prompting a same change to be made after a change has been made to multiple instances of copied text, and/or changing an address based on a changed name to correspond to the changed name.

According to an example implementation, a non-transitory computer-readable storage medium may include instructions stored thereon for propagating changes to copied text. When executed by at least one processor, the instructions may be configured to cause a computing system to at least present copied text within a user interface of the computing system, monitor the user interface for changes to the copied text, receive a change to the copied text, the change including replacing a first instance of a first word, within the copied text, with a first instance of a second word, and in response to receiving the change to the copied text, present a prompt to replace, within the copied text, a second instance of the first word with a second instance of the second word.

A non-transitory computer-readable storage medium may include instructions stored thereon for propagating changes to copied text. When executed by at least one processor, the instructions may be configured to cause a computing system to at least monitor changes to multiple instances of copied text, determine that a same change has been made to the copied text at least a threshold number of times, the threshold number being greater than one, and prompt the same change to be made to a subsequent instance of the copied text based on the determination that the same change has been made to the copied text at least the threshold number of times.

A non-transitory computer-readable storage medium may include instructions stored thereon for correcting errors in copied text. When executed by at least one processor, the instructions may be configured to cause a computing system to at least receive copied text, the copied text including a first name and a first address, the first address immediately following the first name, receive a replacement of the first name with a second name, determine that the second name does not correspond to the first address, based on determining that the second name does not correspond to the first address, determine a second address corresponding to the second name, and present a prompt to replace the first address with the determined second address.

A non-transitory computer-readable storage medium may include instructions stored thereon for correcting errors in copied text. When executed by at least one processor, the instructions may be configured to cause a computing system to at least receive, within an email interface presented by the computing system, an identification of a recipient, and copied text, determine a name associated with the recipient, determine that a name of a person in the copied text is different than the name associated with the recipient, and present a prompt to change the name of the person in the copied text to the name associated with the recipient.

The details of one or more implementations are set forth in the accompa-nying drawings and the description below. Other features will be apparent from the description and drawings, and from the claims.

BRIEF DESCRIPTION OF THE DRAWINGS

FIG. 11 shows an example of a computer device and a mobile computer device that can be used to implement the techniques described here.

DETAILED DESCRIPTION

When users copy text, such as to send letters or emails with the same content to multiple recipients, they may change one part of the text, such as the addressee, but forget to change other parts of the text that should also be changed. These mistakes may be corrected by prompting the user to make a same change to a subsequent instance of the same word or sequence of successive characters, which may be a proper noun and/or name, prompt changes to gendered pronouns based on the gender of the name changing, prompt changes to text based on a same change to the text being made multiple times, prompt a change of an address to correspond to a change of a name of an addressee, and/or prompt a change of a name based on a name of a recipient of an email.

Figure 1:
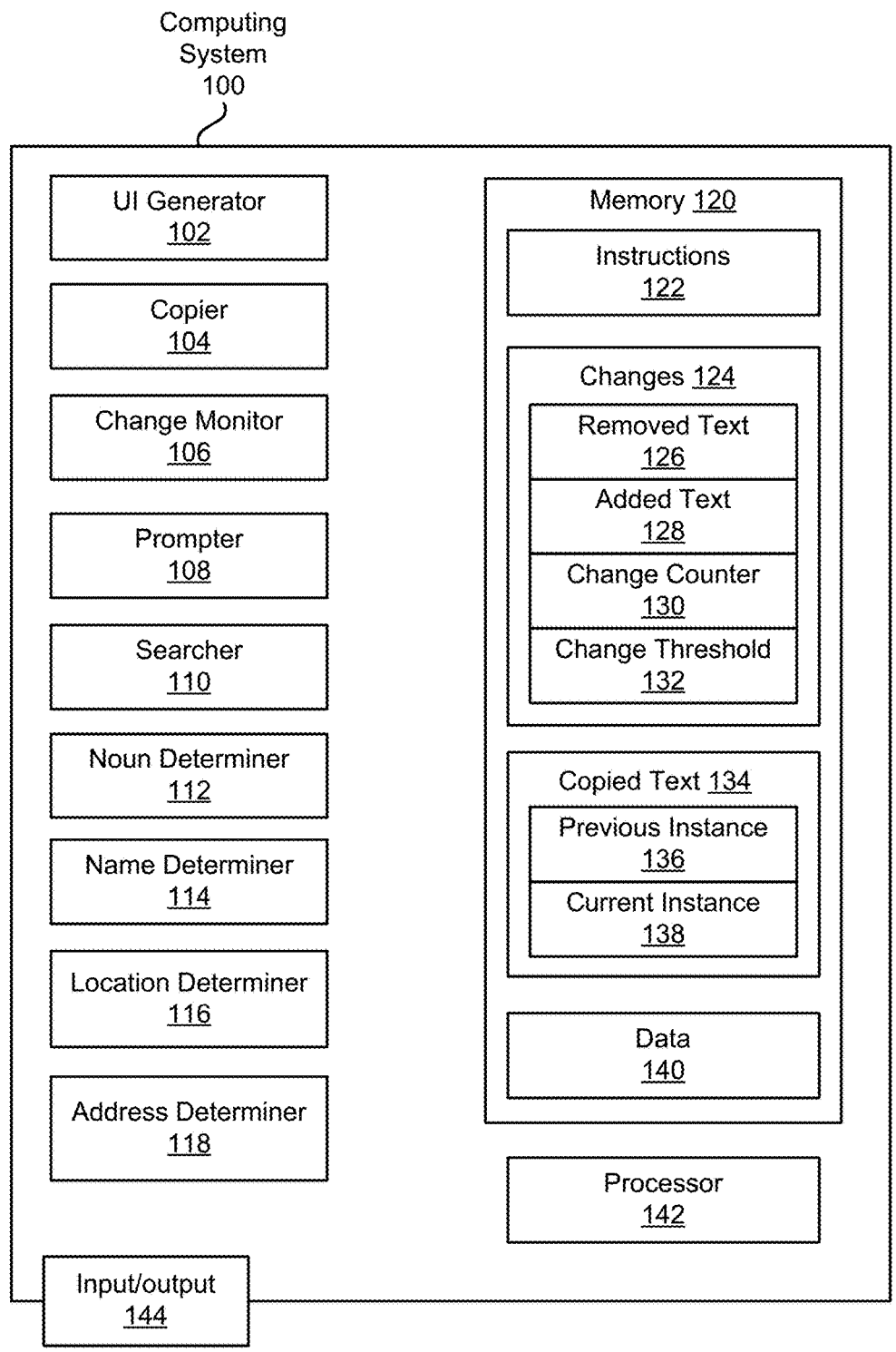
FIG. 1 is a diagram of a computing system for correcting errors in copied text according to an example implementation.

FIG. 1 is a diagram of a computing system 100 for correcting errors in copied text according to an example implementation. The computing system 100 may include a single computing device that performs all the functions described herein, a combination of a client and a server in an example in which the client communicates with the server via a network such as the Internet and the user types text into a browser, or multiple computing devices in an example in which the functions described herein are distributed among multiple computing devices.

The computing system 100 may include a user interface (UI) generator 102. The UI generator 102 may generate a UI to present information, such as text, to a user, and receive input, such as instructions to insert text, delete text, copy text, and/or accept proposed changes or replacements, from the user. The UI may include a word processing application and/or an email application, either or both of which may be included in a local application running on a client computing device or a browser application communicating with a server computing device via the Internet. The computing system 100 may present the UI within a display, which may be an output component of an input/output module 144.

The computing system 100 may include a copier 104. The copier 104 may copy text into the UI, and/or cause the UI to present the copied text, in response to user input to copy the text within the UI. Copying text may include copying (ctrl-C) and pasting (ctrl-V) text into the UI in response to the user input and/or in response to the user instruction to copy the text.

The computing system 100 may include a change monitor 106. The change monitor 106 may monitor the user interface for changes to copied text, such as by monitoring changes to the text in the UI, which changes may include deletions of text, insertions of text, and/or replacements of text. The change monitor 106 may constantly monitor changes to the text in the UI, such as by storing all changes to the text in a changes database 124 and/or messaging a prompter 108 in response to each change to the text.

Changes to the text monitored by the change monitor 106 may include replacing a first instance of a first word with a first instance of a second word (such as by deleting the first instance of the first word and inserting the first instance of the second word at the location from which the first word was deleted), replacing a first string of successive characters (which may include one or multiple words) with a second string of successive characters (which may include one or multiple words), monitoring changes to multiple instances of copied text such as monitoring deletions and/or removals of text within the multiple instances of the copied text, and/or monitoring a replacement of a first name with a second name.

The computing system 100 may include the prompter 108. The prompter 108 may present a prompt for the user to make changes to the copied text, such as replacements of words and/or strings of characters to correspond to previous changes. The prompter 108 may, for example, prompt the user to replace a second instance of a first word with a second instance of a second word based on the change monitor 106 determining that the first instance of the first word was changed to a first instance of the second word. The prompter 108 may prompt the user to replace a first gendered pronoun with a second gendered pronoun of the opposite gender based on the change monitor 106 determining that a first name was changed to a second name and a name determiner 114 determining that the second name is associated with an opposite gender than the first name. The prompter 108 may prompt the user to change a portion and/or instance of copied text based on the change monitor 106 determining that the same change has been made to the copied text at least a threshold number of times. The prompter 108 may prompt the user to change an address based on the change monitor 106 determining that a name has been changed and the address does not correspond to the changed name. The prompter 108 may prompt the user to change a name of a person in copied text of an email based on a name of a recipient of the email being different than the name in the copied text. The prompter 108 may prompt changes to copied text by causing the text, which is to be deleted and/or replaced, to be highlighted. The prompter 108 may prompt changes to copied text by displaying text, which is to replace the deleted text, and/or may prompt changes to insert in the location from which the text was deleted. The prompter 108 may prompt changes to copied text by presenting a button for the user to click on to accept the proposed change.

The computing system 100 may also include a searcher 110. The searcher 110 may search for and/or find text, words, and/or a sequence of characters to change, delete, and/or replace, based on the change to the copied text monitored and/or determined by the change monitor 106. The searcher 110 may search for a second instance (or multiple subsequent instances) of a first word and/or string of successive characters based on a deletion, change, and/or replacement of the first instance of the first word and/or string of successive characters and/or based on the same change being made to multiple instances of copied text. The searcher 110 may search for a gendered pronoun based on a deletion, change, and/or replacement of a proper noun, and the gendered pronoun searched for may have the same gender as the deleted and/or replaced proper noun. The searcher 110 may search for an address immediately following a name based on a deletion, change, and/or replacement of the name, so that the address may be replaced with an address corresponding to the name that replaces the deleted and/or replaced name. The searcher 110 may search for a name within an email, such as a name on a first line of copied text and/or a name immediately following a salutation in the copied text, so that the computing system 100 can determine whether the name within the email is the same as a name associated with a recipient of the email.

The computing system 100 may include a noun determiner 112. The noun determiner 112 may determine whether a word and/or string of successive characters, to which the change monitor 106 determined that a change was made, is a noun and/or proper noun. If the word and/or string of successive characters that was changed is a noun, then the prompter 108 may prompt a change to a second and/or subsequent instance of the word and/or string of successive characters. If the noun determiner 112 determines that the word and/or string of successive characters that was changed is a proper noun, and the gender of the proper noun was changed, then the prompter 108 may prompt a change to one or more gendered pronouns within the copied text. If the noun determiner 112 determines that the word and/or string of successive characters that was changed is not a noun, and/or is a verb, adjective, or adverb, then the prompter 108 may not prompt any further changes to the copied text.

The computing system 100 may include a name determiner 114. The name determiner 114 may determine whether a word and/or string of successive characters, to which the change monitor 106 determined that a change was made, is a name. If the name determiner 114 determines that the word and/or string of successive characters that was changed is a name, then the searcher 110 may search for an address immediately following the name, and if the address immediately following the name does not correspond to an address associated with the name that was inserted and/or that replaced the previous name, the prompter 108 may prompt a change to the address immediately following the name.

The computing system 100 may include a location determiner 116. The location determiner 116 may determine whether a name in copied text, such as text copied into an email, is included in a first line of the copied text and/or immediately follows a salutation. A salutation may be a term and/or word commonly used to begin a letter and/or email, and/or which is typically followed by a name, such as, "To," "Dear," "Hello," and/or "Hi." If the name in the first line of the copied text and/or following the salutation does not correspond to a name associated with a recipient of an email, then the prompter 108 may prompt the name to be changed to and/or replaced with the name associated with the recipient of the email.

The computing system 100 may include an address determiner 118. The address determiner 118 may determine an address associated with a name. The address determiner 118 may determine the address associated with the name by consulting a database included in the computer system 100, and/or by performing an Internet search on the name.

The computing system 100 may include at least one memory device 120. The memory device 120 may include a non-transitory computer-readable storage medium. The memory device 120 may include instructions 122 stored thereon. The instructions 122, when executed by at least one processor 142, may be configured to cause the computing system 100 to perform any combination of the functions, methods, and/or processes described herein.

The computing system 100 may include a changes database 124 in the memory device 120. The changes database 124 may store changes made to copied text, such as changes monitored by the change monitor 106, and/or information related to the changes stored for the purpose of determining whether to prompt a subsequent change to the copied text. The changes database 124 may include removed text 126, which may include removed and/or deleted words, strings of successive characters, and/or the locations of the removed and/or deleted strings of successive characters. The changes database 124 may include added text 128, which may include added and/or inserted words, strings of successive characters, and/or the locations of the added and/or inserted strings of successive characters. The changes database 124 may also include associations between the removed text 126 and the added text 128.

The changes database 124 may include a change counter 130. The change counter 130 may maintain a count of a number of times that a same change is made to copied text, such as a number of times that a same word and/or string of successive characters is removed and/or deleted from the copied text. The change monitor 106 may increment the change counter 130 each time the same change is made to the copied text. The change counter 130 may maintain a separate count for each change (such as each deleted and/or removed word and/or string of successive characters, and/or each copied text). The changes database 124 may also include a change threshold 132. The change threshold 132, which may be at least two, may be a number of times, after which a same change to multiple previous instances of copied text is made, the prompter 108 will prompt the same change to subsequent instances of copied text.

The memory 120 may include copied text 134. The copied text 134 may include previous instances 136 of copied text, and the changes made to the previous instances, and a current instance 138 of the copied text. The current instance 138 of the copied text may be displayed in the UI.

The memory 120 may also include other data 140. The data 140 may include data used by other applications executed by the computing system 100, and/or data used by the computing system 100 to propagate changes and/or correct errors in copied text, not described above.

The computing system 100 may also include at least one processor 142. The at least one processor 142 may be capable of executing instructions, such as the instructions 122, to cause the computing system 100 to perform any combination of the functions, methods, and/or processes described herein.

The computing system 100 may also include an input/output module 144. The input/output module 144 may include one or more input interfaces and one or more output interfaces. The input interfaces and output interfaces may include wired or wireless nodes for communicating with other computing systems, such as servers. The input interface(s) may include a keyboard, mouse, touchscreen, and/or microphone, as non-limiting examples. The output interface(s) may include a display and/or speaker, as non-limiting examples.

Figure 2A:
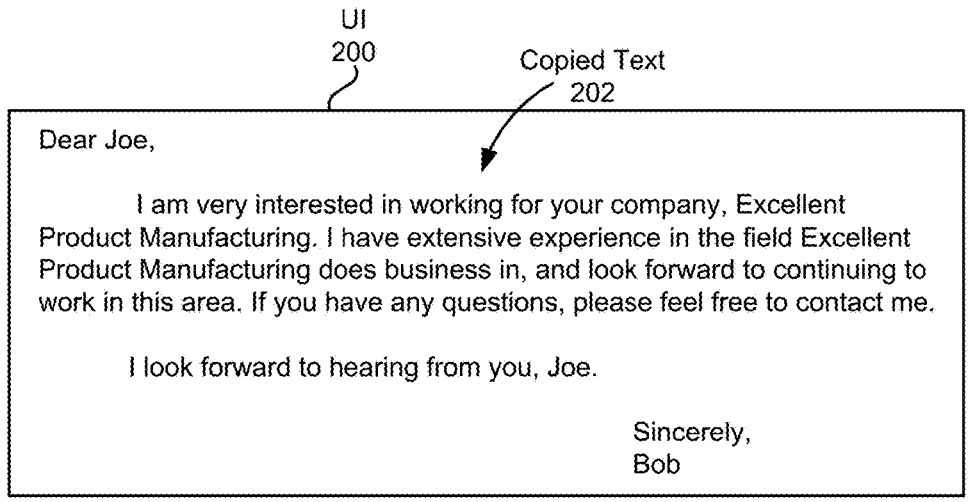
FIG. 2A shows a user interface (UI) with copied text according to an example implementation.

FIG. 2A shows a user interface (UI) 200 with copied text 202 according to an example implementation. The UI generator 102 may have generated the UI 200, and the computing system 100 may present the UI 200 within a display, which may be included in the input/output modules 144. The copier 104 may have copied the copied text 202 from another application, or from a previous document in the same application. The UI 200 may be displayed as part of an application such as a word processing application or an email application.

Figure 2B:
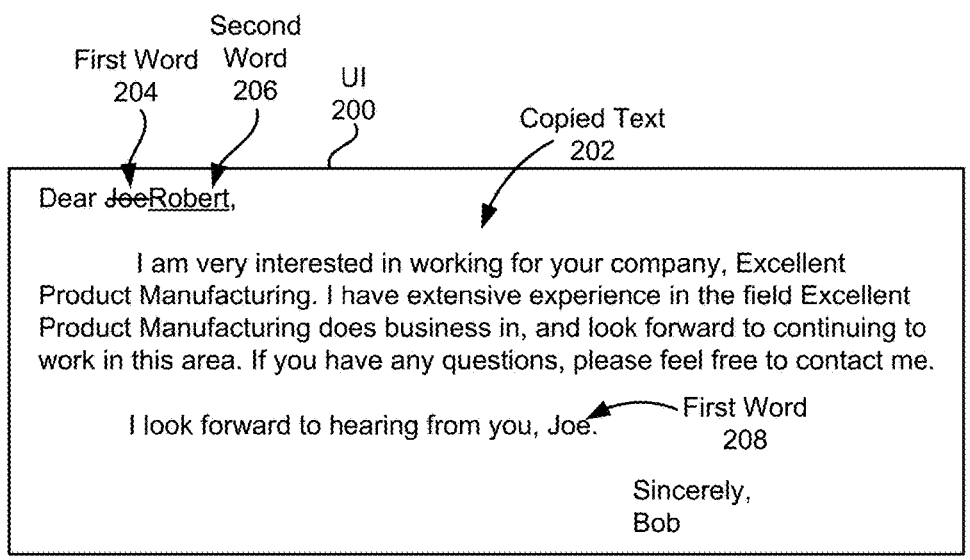
FIG. 2B shows the UI with a first instance of a first word in the copied text replaced according to an example implementation.

FIG. 2B shows the UI 200 with a first instance of a first word 204 in the copied text 202 replaced according to an example implementation. In this example, the first word 204, "Joe," may be a name of an addressee of the copied text 202. The first word 204 may be removed and/or deleted, and replaced by inserting a second word 206, "Robert," into the location in the copied text 202 from which the first word 204 was removed and/or deleted. The change monitor 106 may monitor the deletion of "Joe" and the insertion of "Robert," and pass the deletion and insertion to the noun determiner 112. The noun determiner 112 may determine that "Joe"

and/or "Robert" are nouns. The noun determiner 112 may, based on determining that the first instance of the first word 204 "Joe" and/or the first instance of the second word 206 "Robert" are nouns, prompt the prompter 108 to determine whether to replace a second instance of the first word 208 "Joe" with a second instance of the first word "Robert."

The copied text 202 may include the second instance of the first word 208, "Joe." After the replacement of the first instance of the first word 204, "Joe," with the first instance of the second word 206, "Robert," the second instance of the first word 208, "Joe," may be inconsistent and/or erroneous. The searcher 110 may find the second instance of the first word 208 based on the replacement of the first instance of the first word 204 with the first instance of the second word 206 and the determination that the first instance of the first word 204 "Joe" and/or the first instance of the second word 206 "Robert" are nouns.

Figure 2C:
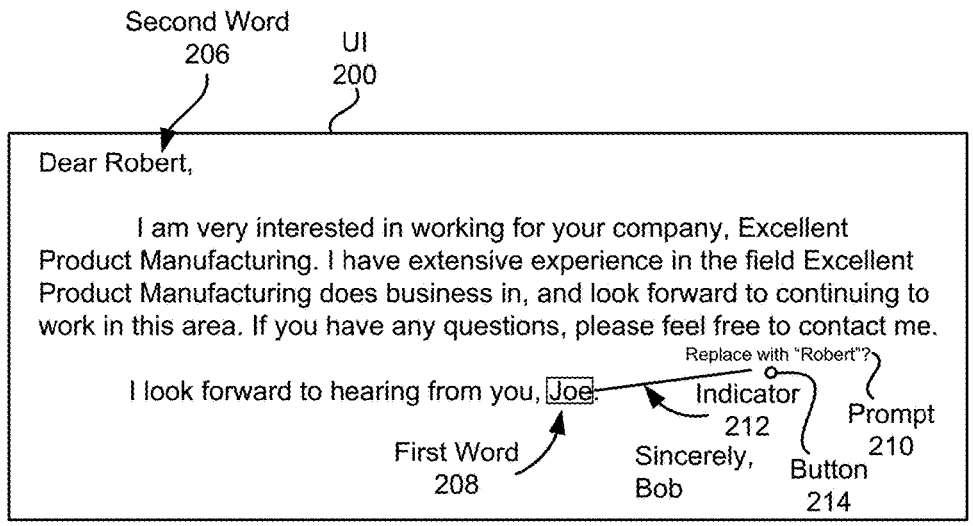
FIG. 2C shows the UI with a prompt to replace a second instance of the first word in the copied text according to an example implementation.

FIG. 2C shows the UI 200 with a prompt 210 to replace the second instance of the first word 208 in the copied text 202 according to an example implementation. In the example shown in FIG. 2C, the prompter 108 may highlight the second instance of the first word 208, "Joe," to show the user which word is to be replaced (the highlighting is shown in FIG. 2C as a box around the first word 208). The prompter 108 may also generate a prompt 210, which may include text inquiring whether the user wishes to replace the second instance of the first word 208, "Joe," with a second instance of the second word, "Robert." In this example, the text, "Replace with 'Robert'?", included in the prompt 210 includes the second word, "Robert," which will replace the first word 208. The prompter 108 may also generate an indicator 212, such as a line, from the prompt 210 to the second instance of the first word 208, to further identify the word to be replaced. The prompter 108 may also generate a button 214, which the user may press and/or click to accept the proposed replacement, deleting, "Joe," and inserting, "Robert."

Figure 2D:
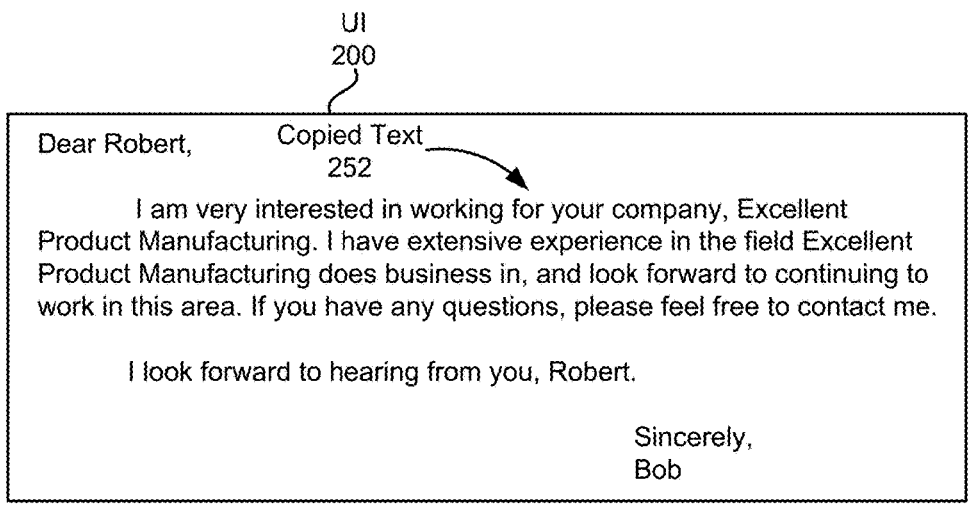
FIG. 2D shows the UI with copied text according to another example implementation.

FIG. 2D shows the UI 200 with copied text 252 according to another example implementation. The copier 104 may have copied the copied text 252 from another application, or from a previous document.

Figure 2E:
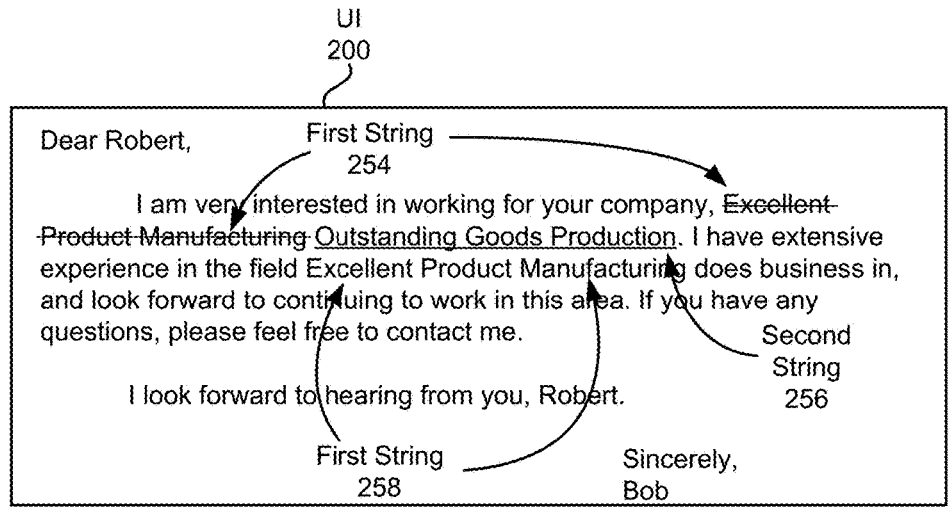
FIG. 2E shows the UI with a first instance of a first string in the copied text replaced according to an example implementation.

FIG. 2E shows the UI 200 with a first instance of a first string 254 in the copied text 252 replaced according to an example implementation. In this example, the first string 254 is a first string of successive characters, "Excellent Product Manufacturing." The user is replacing the first instance of the first string 254 with a second string 256 of successive characters, "Outstanding Goods Production." After the user has replaced the first instance of the first string 254 with the first instance of the second string 256, the copied text 252 still includes a second instance of the first string 258, "Excellent Product Manufacturing." If the user forgot to replace the second instance of the first string 258, sending the letter could result in embarrassment and/or a reduced likelihood of receiving a job offer.

Figure 2F:
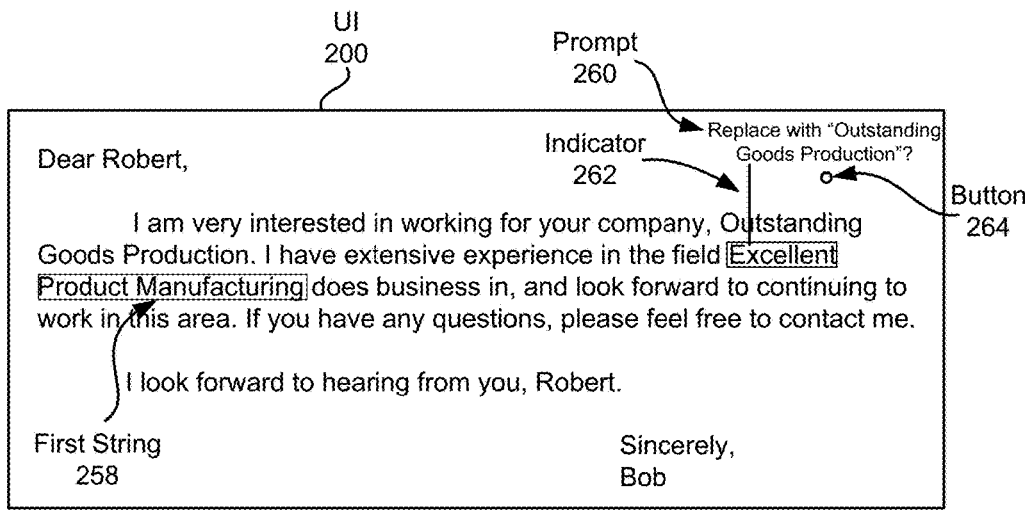
FIG. 2F shows the UI with a prompt to replace a second instance of the first string in the copied text according to an example implementation.

FIG. 2F shows the UI 200 with a prompt 260 to replace the second instance of the first string 258 in the copied text 252 according to an example implementation. In this example, the prompter 108 may prompt the user to replace the second instance of the first string 258 with a second instance of the second string 256, such as by highlighting the second instance of the first string 258 (the highlighting is shown in FIG. 2F as boxes around the second instance of the first string 258). The prompter 108 may also generate a prompt 260, which may include text, "Replace with 'Outstanding Goods Production'?", including the second string 256, "Outstanding Goods Production," which will replace the first string 258. The prompter 108 may also generate an indicator 262, such as a line from the prompt 260 to the second instance to the first string 258, to further identify the second instance of the first string 258 to be replaced with a second instance of the second string. The prompter 108 may also generate a button 264, which the user may press and/or click on to accept the proposed change to replace the second instance of the first string 258 with a second instance of the second string.

Figure 3A:
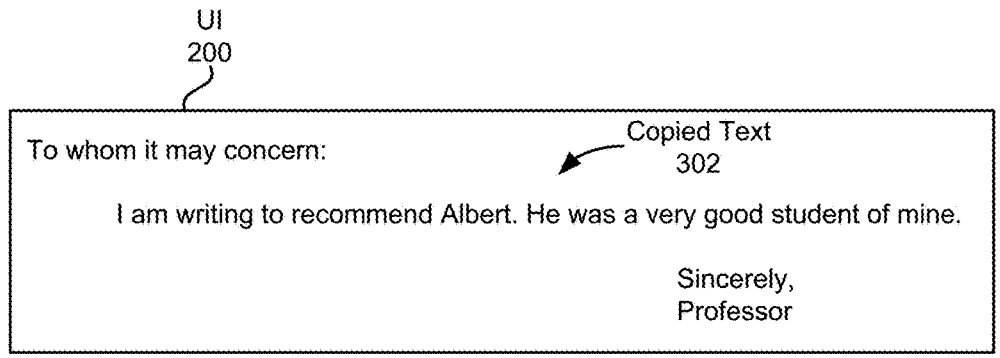
FIG. 3A shows the UI with copied text according to another example implementation.

FIG. 3A shows the UI 200 with copied text 302 according to another example implementation. The copier 104 may have copied the copied text 302 from another application, or from a previous document.

Figure 3B:
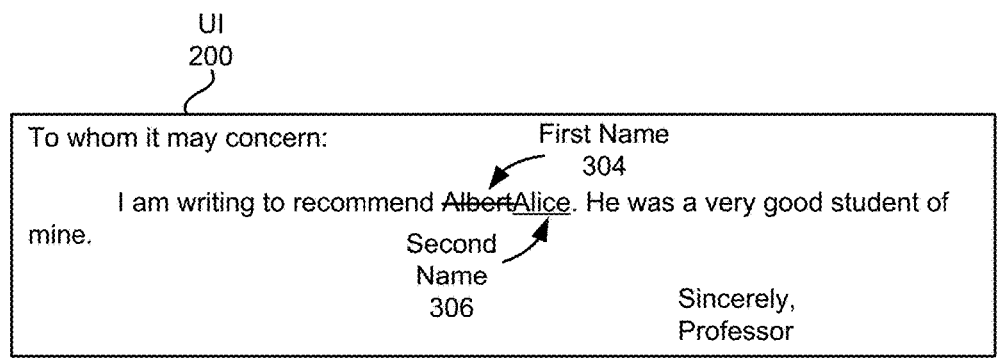
FIG. 3B shows the UI with a proper name replaced with another proper name of the opposite gender according to an example implementation.

FIG. 3B shows the UI 200 with a proper name replaced with another proper name of the opposite gender according to an example implementation. In this example, a first name 304, "Albert," is replaced with a second name 306, "Alice," such as by removing and/or deleting the first name 304 and adding and/or inserting the second name 306 at the same location in the copied text 302 from which the first name 304 was removed and/or deleted. The change monitor 106 may monitor the change from "Albert" to "Alice," and may query the noun determiner 112 to determine whether "Albert" and "Alice" are proper nouns, and whether "Alice" has an opposite gender from "Albert." In this example, the noun determiner 112 determines that the second name 306, "Alice," is associated with the female gender, the opposite gender of the first name 304, "Albert," which is associated with the male gender. The noun determiner 112 may respond to the change monitor 106 with an answer that the gender has been changed from male to female.

Based on the answer and/or result that the gender of a proper noun has been changed from male to female, the change monitor 106 and/or prompter 108 may instruct the searcher 110 to search for any gendered pronouns, specifically any pronouns associated with the male gender. In this example, the copied text 302 includes a male pronoun 316, "He," which was consistent with the gender associated with the first name 304, but is inconsistent with the gender associated with the second name 306 which replaced the first name 304. The searcher 110 and/or noun determiner 112 determine that the copied text 302 includes a gendered pronoun associated with the same gender as the replaced word and/or first name 304, "Albert." Based on the searcher 110 and/or noun determiner 112 determining that the copied text 302 including the gendered pronoun associated with the same gender as the replaced word and/or first name 304, "Albert," the prompter 108 may generate a prompt to change the gendered pronoun to a gendered pronoun associated with the opposite gender.

Figure 3C:
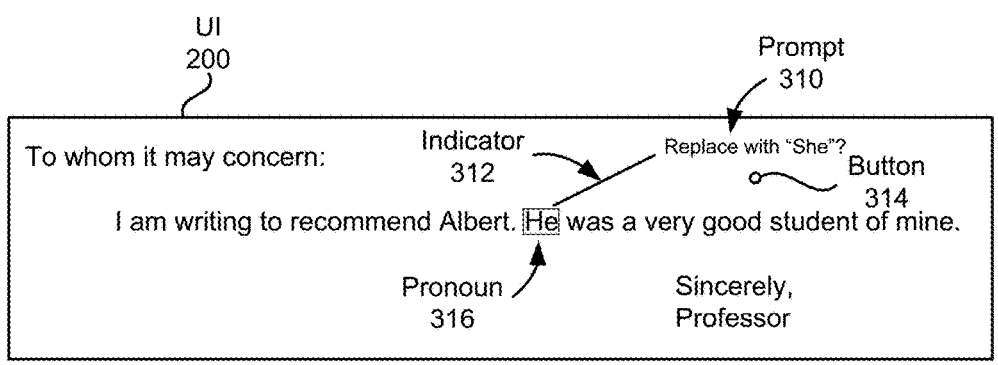
FIG. 3C shows the UI with a prompt to replace a pronoun with another pronoun of the opposite gender according to an example implementation.

FIG. 3C shows the UI 200 with a prompt 310 to replace the pronoun 316 with another pronoun of the opposite gender according to an example implementation. In this example, as described above, the prompter 108 may have determined, and/or been called or prompted based on the determination that, the pronoun 316, "He," is inconsistent with the second name 306, "Alice." The prompter 108 may prompt the user to replace the pronoun 316, "He," with a pronoun of the opposite gender, "She." The prompter 108 may highlight the pronoun 316 that the prompter 108 proposes to replace (the highlighting is shown in FIG. 3C as a box around the pronoun 316). The prompter 108 may generate a prompt 310, which may include text, "Replace with 'She'?", with the pronoun of the opposite gender ("She"). The prompter 108 may include and/or generate an indicator 312, such as a line from the prompt 310 to the pronoun 316, to further identify the pronoun 316 to be replaced. The prompter 108 may also generate a button 314, which the user may press and/or click on to accept the proposed replacement to delete the gendered pronoun 316 and insert a corresponding pronoun associated with the opposite gender.

Figure 4A:
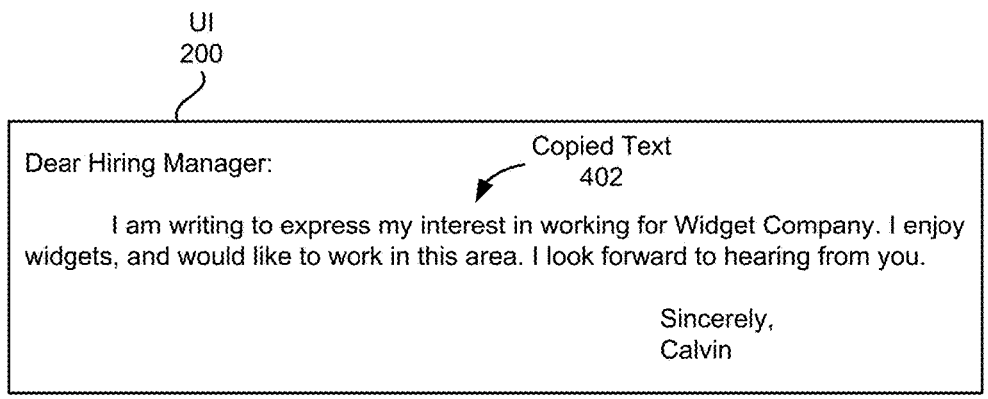
FIG. 4A shows the UI with copied text according to another example implementation.

FIG. 4A shows the UI 200 with copied text 402 according to another example implementation. In this example the copied text 402 is a job application letter that identifies the company, "Widget Company," at which "Calvin" is applying for a job. The copier 104 may have copied the copied text 402 from another application, or from a previous document.

Figure 4B:
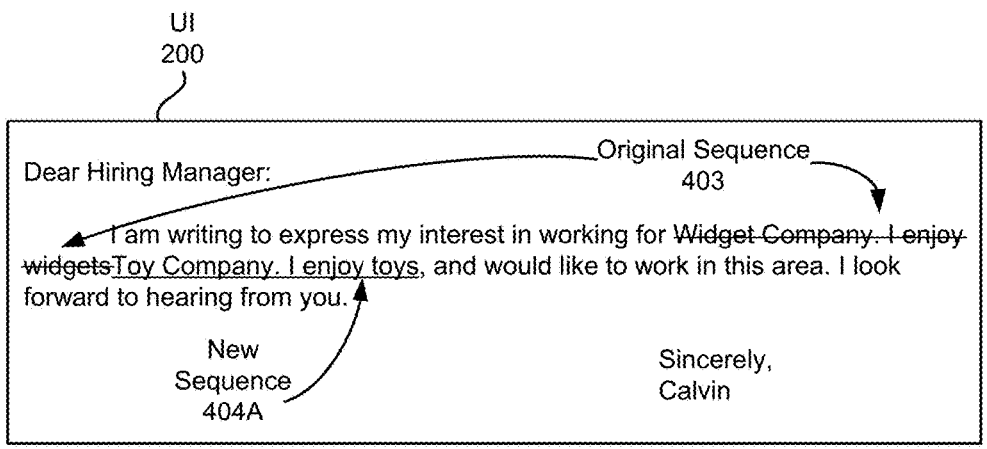
FIG. 4B shows the UI with a change made to the copied text according to an example implementation.

FIG. 4B shows the UI 200 with a change made to the copied text 402 according to an example implementation. In this example, the user has changed the name of the company and an expression of interest in the business of the company by replacing, "Widget Company. I enjoy widgets," with, "Toy Company. I enjoy toys." The replacement may include removing and/or deleting an original sequence 403 and/or string of characters, "Widget Company. I enjoy widgets," and adding and/or inserting a new sequence 404A and/or string of characters, "Toy Company. I enjoy toys," at the location from which the original sequence 403 of characters was removed and/or deleted. The change monitor 106 may increment the change counter 130 in response to the removal and/or deletion of the original sequence 403.

Figure 4C:
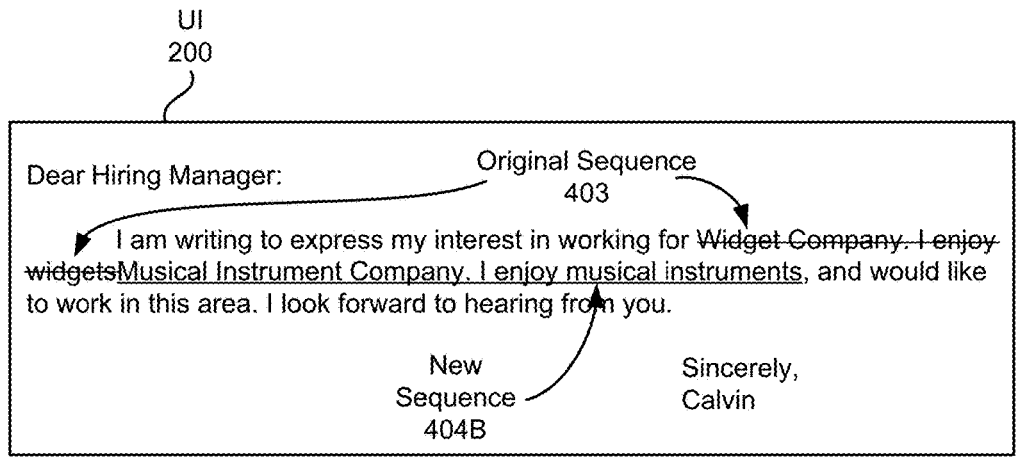
FIG. 4C shows the UI with the same change made to the copied text as in the example shown in FIG. 4B according to an example implementation.

FIG. 4C shows the UI 200 with the same change made to the copied text 402 as in the example shown in FIG. 4B according to an example implementation. In this example, the same change to the copied text 402 may be the removal and/or deletion of the original sequence 403. The copier 104 may have copied the copied text 402 so that the user could apply to another company, "Musical Instrument Company."

In this example, the same change to the copied text 402 as was made in the example shown in FIG. 4B, which may include deleting and/or removing the original sequence 403, "Widget Company. I enjoy widgets." The user may replace the original sequence 403 with a new sequence 404B and/or string of characters, "Musical Instrument Company. I enjoy musical instruments," to apply to work for, and express his interest in the business of, "Musical Instrument Company." The change monitor 106 may increment the change counter 130 to reflect another (for example, second), same change to the copied text 402 as was shown and described with respect to FIG. 4B. This change may cause the value stored in the change counter 130 to meet or exceed the change threshold 132.

Figure 4D:
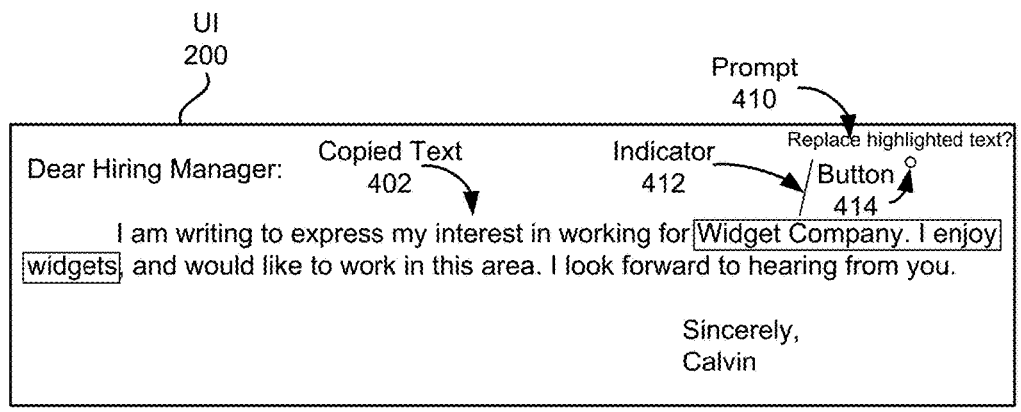
FIG. 4D shows the UI with a prompt to make the same change to the copied text as in the examples shown in FIGS. 4B and 4C.

FIG. 4D shows the UI 200 with a prompt 410 to make the same change to the copied text 402 as in the examples shown in FIGS. 4B and 4C. In this example, the copier 104 may have again copied the copied text 402 for the user to change for applying to work for another company. The prompter 108 may anticipate the change to the copied text 402 by prompting, and/or generating a prompt for, based on the change counter 130 meeting or exceeding the value stored in the change threshold 132, the user to delete, remove, and/or replace the original sequence 403 and/or string of characters, "Widget Company. I enjoy widgets."

The prompter 108 may cause the original sequence 403 to be highlighted, showing the user the text to be replaced, deleted, and/or removed (the highlighting is shown in FIG. 4D as boxes around the text). The prompter 108 may also generate a prompt 410 with text, such as, "Replace highlighted text?" The prompter 108 may also generate a button 414. The user may click on the button 414, to which the prompter 108 may respond by removing and/or deleting the original sequence 403 and placing a cursor at the location from which the original sequence 403 was removed and/or deleted, so that the user can easily add new text at the location from which the original sequence 403 was removed and/or deleted.

Figure 5A:
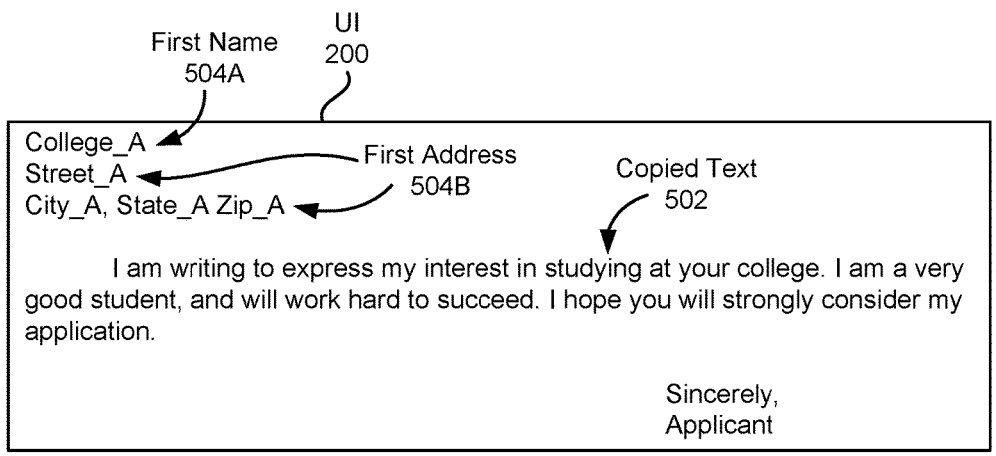
FIG. 5A shows the UI with copied text according to an example implementation.

FIG. 5A shows the UI 200 with copied text 502 according to an example implementation. The copier 104 may have copied the copied text 502 from another application, or from a previous document. The copied text 502 may include a portion of a letter, as well as a first name 504A, which may be the name or a person or the name of an institution, in this example, "College_A," and a first address 504B. The first address 504B may be associated with the first name 504A, and in this example is, "Street_A; City_A, State_A Zip_A."

Figure 5B:
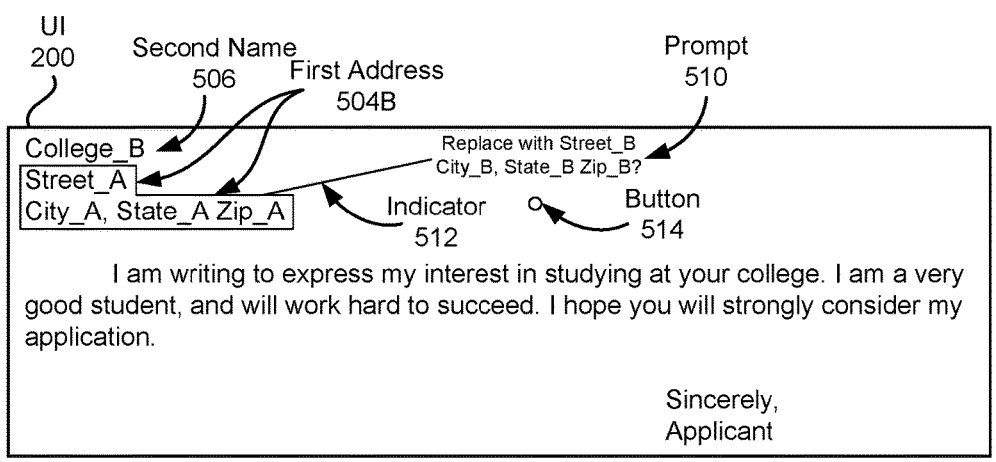
FIG. 5B shows the UI with the copied text and a prompt to change an address after a name has been changed according to an example implementation.

FIG. 5B shows the UI 200 with the copied text 502 and a prompt 510 to change the address 504B after a name has been changed according to an example implementation. In this example, the user may have replaced the first name 504A with a second name 506, in this example, "College B," and the name determiner 114 may determine that the replaced portion of the copied text 502 was a name. Based on the name determiner determining that the replaced portion of the copied text 502 was a name, the address determiner 118 may determine that the first address 504B is not associated with the second name 506. Based on determining that the first address 504B is not associated with the second name 506, the address determiner 118 may determine a second address, "Street_B; City_B, State_B Zip_B," associated with the second name 506.

Based on the determination that the first address 504B is not associated with the second name 506, the prompter 108 may cause the first address 504B to be highlighted, to bring the incorrect address to the user's attention (in FIG. 5B the highlighting is shown as a polygon around the first address 504B). The prompter 108 may also generate a prompt 510, which may include text inquiring whether the user wants to replace the first address 504B with the second address, the second address having been determined by the address determiner 118. In this example, the text included in the prompt 510 is, "Replace with Street_B City_B, State_B Zip_B?" The prompter 108 may generate a button 514, and may respond to the user pressing and/or clicking the button 514 by replacing the first address 504B with the second address.

Figure 6A:
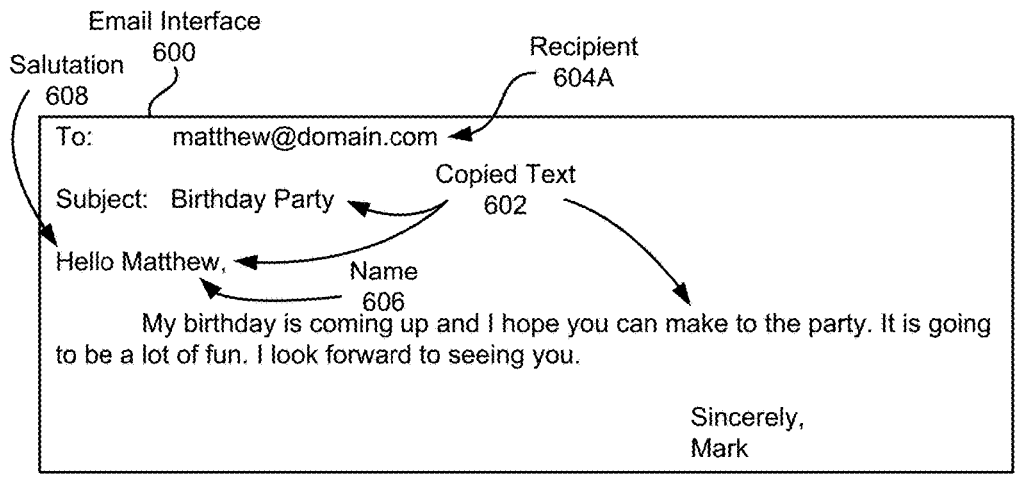
FIG. 6A shows an email interface with a recipient and copied text according to an example implementation.

FIG. 6A shows an email interface 600 with a recipient 604A and copied text 602 according to an example implementation. The email interface 600 may have been generated by the UI generator 102, and may enable a user to generate and send an email to the recipient 604A. The email interface 600 may include an email with an identification of the recipient 604A, such as an email address, and copied text 602. The computing system 100 may send the email, including the copied text 602, to the recipient 604A, in response to a send instruction from the user. The copied text 602 may have been copied into the email interface 600 by the copier 104, and may include a name 606, "Matthew," following a salutation 608, "Hello." The name determiner 114 may determine that the name 606 is associated with the email address, "matthew@domain.com," of the recipient 604A. The location determiner 116 may determine that the name 606 is on the first line of the copied text 602 and/or immediately follows the salutation 608, "Hello."

Figure 6B:
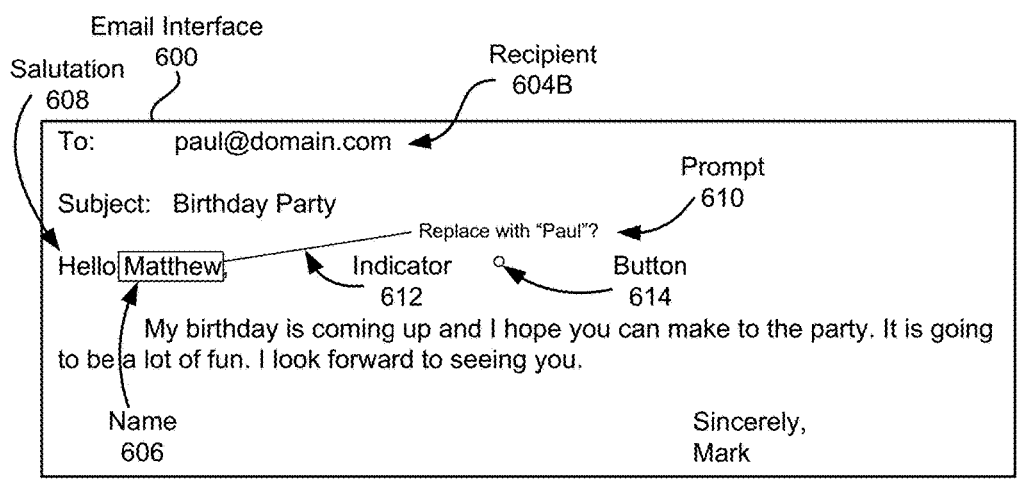
FIG. 6B shows the email interface with a different recipient than the example of FIG. 6A, and a prompt to change the copied text based on the different recipient according to an example implementation.

FIG. 6B shows the email interface 600 with a different recipient 604B than the example of FIG. 6A, and a prompt 610 to change the copied text 602 based on the different recipient 604B according to an example implementation. In this example, the copier 104 may have copied the copied text 602 from the example shown in FIG. 6A or a previous instance in response to an instruction from the user, and the user may be re-using the copied text 602 to send birthday party invitations to multiple recipients.

In this example, the copied text 602 may include the name 606, even though the user has entered a new recipient 604B for the email. The name determiner 114 may determine that a name associated with the email address, "paul@domain.com," of the new recipient 604B, is "Paul." The prompter 108 may determine that the name, Paul," of the new recipient 604B, is not the same as the name 606 included in the first line and/or immediately following the salutation 608 in the copied text 602.

Based on the determination that the name, "Paul," of the new recipient 604B, is not the same as the name 606 included in the copied text 602, the prompter 108 may prompt the user to replace the name 606, "Matthew," included in the copied text 602, with the name, "Paul," associated with the email address, "paul@domain.com," of the new recipient 604B, such as by deleting and/or removing the name 606 and inserting and/or adding the name of the new recipient 604B in the location from which the name 606 was deleted and/or removed. The prompter 108 may prompt the replacement by highlighting the name 606 (the highlighting is shown in FIG. 6B as a box around the name 606). The prompter 108 may also prompt the replacement by generating a prompt 610. The prompt 610 may include text inquiring whether the user wishes to replace the name 606, and/or may include the name of the new recipient 604B. In the example shown in FIG. 6B, the prompt 610 includes the text, "Replace with 'Paul'?" The prompter 108 may also generate an indicator 612, such as a line from the prompt 610 to the name 606, strengthening the association between the prompt 610 and the name 606 to be replaced. The prompter 108 may also generate a button 614. The prompter 108 may respond to the user pressing and/or clicking the button 614 by replacing the first name, "Matthew," with the second name, "Paul," in the first line of the copied text 602 and/or immediately following the salutation 608 within the copied text 602.

In an example implementation, the prompter 108 may determine whether the name 606 corresponds to the name associated with the recipient 604B in response to the computing system 100 receiving a send instruction from the user. In response to receiving the send instruction, the prompter 108 may determine the name associated with the recipient 604B, and the name 606 included in the text (whether the text was copied or typed without copying), which may be in a first line of the text and/or immediately following a salutation 608. If the name associated with the recipient 604B is not the same as the name 606 included in the text, then the prompter 108 may prompt the change to replace the name 606 with a name that is the same as the name associated with the recipient 604B.

Figure 7:
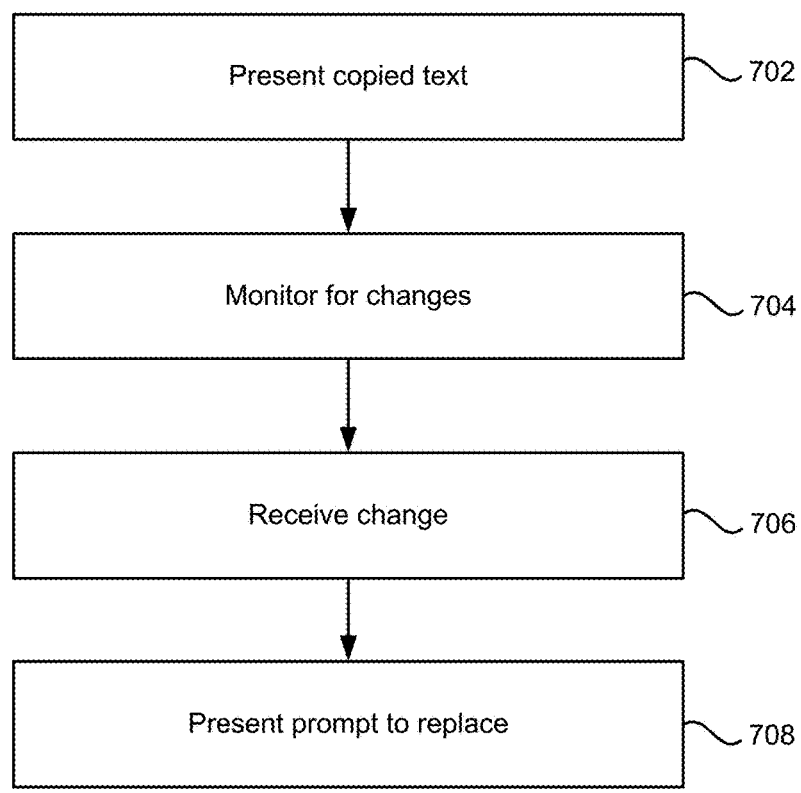
FIG. 7 is a flowchart of a method for propagating changes to copied text according to an example implementation.

FIG. 7 is a flowchart of a method 700 for propagating changes to copied text according to an example implementation. The method 700 may include presenting copied text within a user interface of a computing system (702). The method 700 may also include monitoring the user interface for changes to the copied text (704). The method 700 may also include receiving a change to the copied text, the change including replacing a first instance of a first word, within the copied text, with a first instance of a second word (706). The method 700 may also include, in response to receiving the change to the copied text, presenting a prompt to replace, within the copied text, a second instance of the first word with a second instance of the second word (708).

According to an example implementation, the presenting the copied text (702) may be performed in response to receiving an instruction to copy the text within the user interface.

According to an example implementation, the user interface may include a word processing application.

According to an example implementation, the user interface may be presented within a display.

According to an example implementation, the monitoring the user interface (704) may include constantly monitoring the user interface for changes to the copied text.

According to an example implementation, the first word may include a first string of successive characters and the second word may include a second string of successive characters.

According to an example implementation, the presenting the prompt (708) may include highlighting the second instance of the first word.

According to an example implementation, the presenting the prompt (708) may include displaying text querying whether a user wants to replace the second instance of the first word with the second instance of the second word, and displaying a button for the user to click on to replace the second instance of the first word with the second instance of the second word.

According to an example implementation, the method 700 may further include searching for and finding the second instance of the first word in response to receiving the change to the copied text.

According to an example implementation, the method 700 may further include determining that the first word is a proper noun and the second word is a proper noun, and the presenting the prompt (708) may include presenting the prompt to replace the second instance of the first word with the second instance of the second word based on the determining that the first word is a proper noun and the second word is a proper noun.

According to an example implementation, the method 700 may further include determining that the first word is a first name of a person and the second word is a second name of a person, the second name having an opposite gender from the first name, and presenting a second prompt to replace, within the copied text, a first gendered pronoun with a second gendered pronoun, the second gendered pronoun having the opposite gender from the first gendered pronoun.

Figure 8:
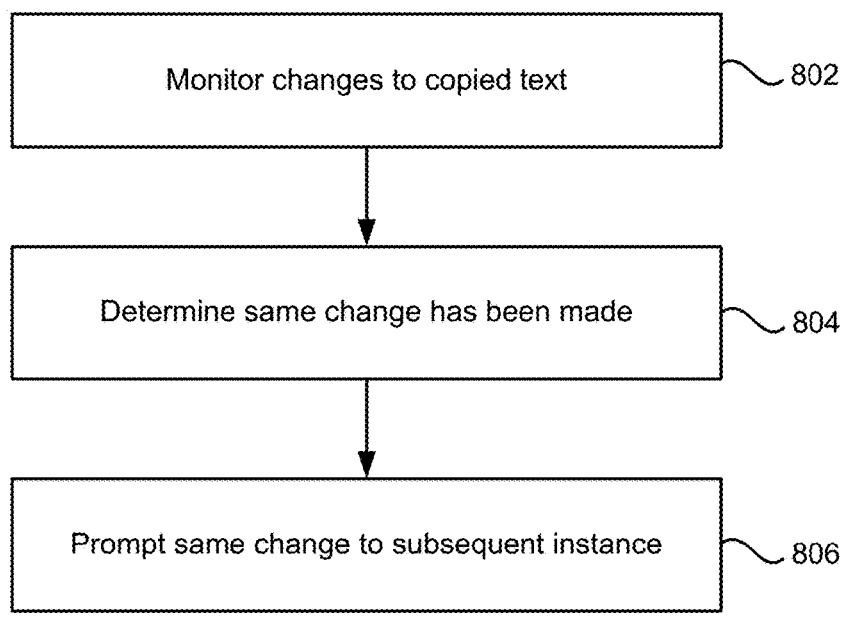
FIG. 8 is a flowchart of a method for propagating changes to copied text according to another example implementation.

FIG. 8 is a flowchart of a method 800 for propagating changes to copied text according to another example implementation. The method 800 may include monitoring changes to multiple instances of copied text (802). The method 800 may also include determining that a same change has been made to the copied text at least a threshold number of times, the threshold number being greater than one (804). The method 800 may also include prompting the same change to be made to a subsequent instance of the copied text based on the determination that the same change has been made to the copied text at least the threshold number of times (806).

According to an example implementation, the method 800 may further include incrementing a change counter each time the same change is made to an instance of the copied text. In this example, the determining that the same change has been made to the copied text at least the threshold number of times (804) may include comparing the change counter to the threshold number.

According to an example implementation, the copied text may be presented in a user interface of a computing system, the same change may be made in the user interface at least the threshold number of times, and the prompt may be presented in the user interface.

According to an example implementation, the multiple instances of copied text may be presented in a word processing application.

According to an example implementation, the multiple instances of copied text may be presented in an email interface.

According to an example implementation, the same change to the multiple instances of copied text may include removing an original sequence of characters from the copied text, and the prompting the same change to be made to the subsequent instance of the copied text may include highlighting, in the subsequent instance of the copied text, the original sequence of characters.

Figure 9:
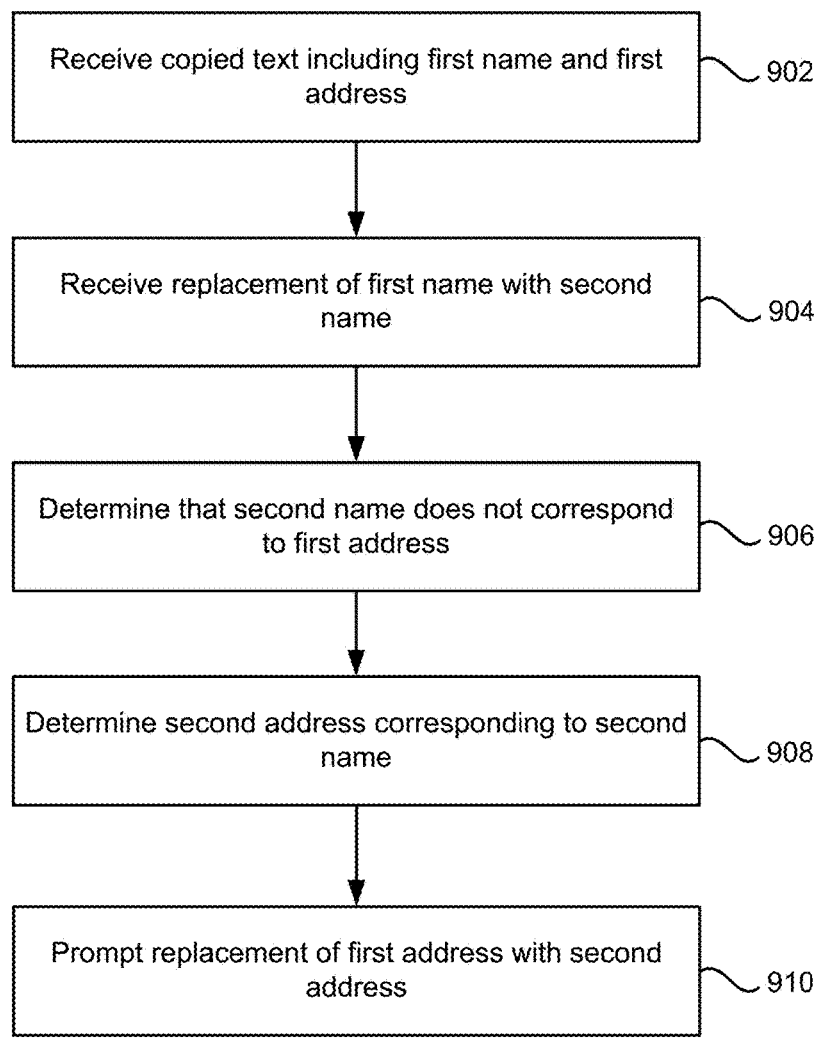
FIG. 9 is a flowchart of a method for correcting errors in copied text according to an example implementation.

FIG. 9 is a flowchart of a method 900 for correcting errors in copied text according to an example implementation. The method 900 may include receiving copied text, the copied text including a first name and a first address, the first address immediately following the first name (902). The method 900 may include receiving a replacement of the first name with a second name (904). The method 900 may include determining that the second name does not correspond to the first address (906). The method 900 may include, based on determining that the second name does not correspond to the first address, determining a second address corresponding to the second name (908). The method 900 may include presenting a prompt to replace the first address with the determined second address (910).

According to an example implementation, the determining that the second name does not correspond to the first address, and the determining the second address corresponding to the second name, may include performing an Internet search on the second name.

Figure 10:
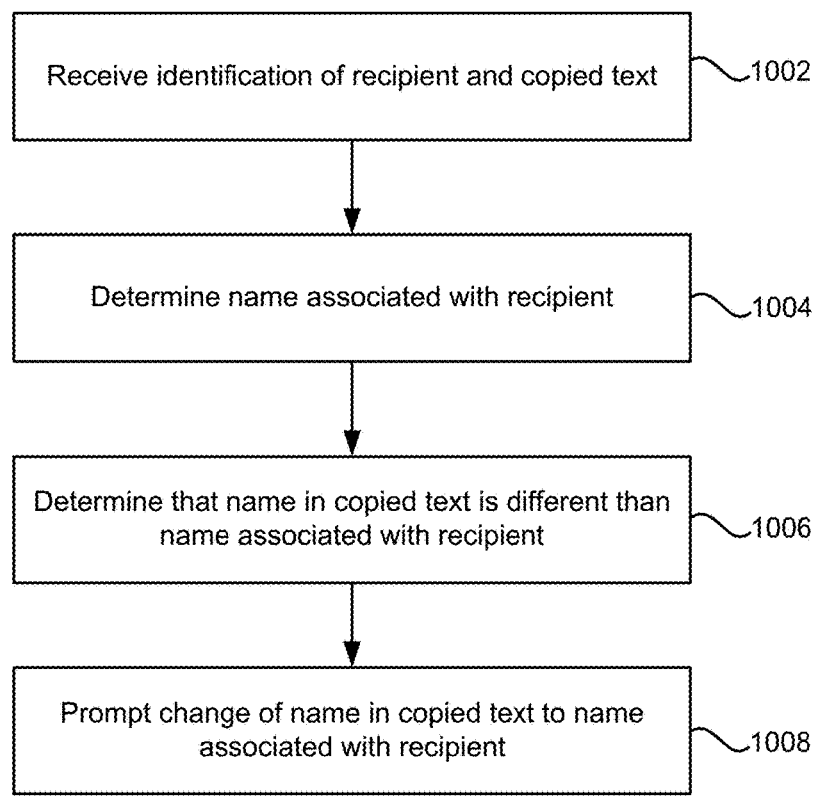
FIG. 10 is a flowchart of a method for correcting errors in copied text according to another example implementation.

FIG. 10 is a flowchart of a method 1000 for correcting errors in copied text according to another example implementation. The method 1000 may include receiving, within an email interface presented by a computing system, an identification of a recipient, and copied text (1002). The method 1000 may include determining a name associated with the recipient (1004). The method 1000 may include determining that a name of a person in the copied text is different than the name associated with the recipient (1006). The method 1000 may include presenting a prompt to change the name of the person in the copied text to the name associated with the recipient (1008).

According to an example implementation, the determining that the name of the person in the copied text is different than the name associated with the recipient (1006) may include determining that a name of a person in a first line of the copied text is different from the name associated with the recipient.

According to an example implementation, the determining that the name of the person in the copied text is different than the name associated with the recipient (1006) may include determining that a name of a person immediately following a salutation in the copied text is different than the name associated with the recipient.

According to an example implementation, the determining that the name of the person in the copied text is different than the name associated with the recipient (1006) may be performed in response to a send instruction.

FIG. 11 shows an example of a generic computer device 1100 and a generic mobile computer device 1150, which may be used with the techniques described here. Computing device 1100 is intended to represent various forms of digital computers, such as laptops, desktops, workstations, personal digital assistants, servers, blade servers, mainframes, and other appropriate computers. Computing device 1150 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1100 includes a processor 1102, memory 1104, a storage device 1106, a high-speed interface 1108 connecting to memory 1104 and high-speed expansion ports 1110, and a low speed interface 1112 connecting to low speed bus 1114 and storage device 1106. Each of the components 1102, 1104, 1106, 1108, 1110, and 1112, are interconnected using various busses, and may be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as display 1116 coupled to high speed interface 1108. In other implementations, multiple processors and/or multiple buses may be used, as appropriate, along with multiple memories and types of memory. Also, multiple computing devices 1100 may be connected, with each device providing portions of the necessary operations (e.g., as a server bank, a group of blade servers, or a multi-processor system).

The memory 1104 stores information within the computing device 1100. In one implementation, the memory 1104 is a volatile memory unit or units. In another implementation, the memory 1104 is a non-volatile memory unit or units. The memory 1104 may also be another form of computer-readable medium, such as a magnetic or optical disk.

The storage device 1106 is capable of providing mass storage for the computing device 1100. In one implementation, the storage device 1106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1104, the storage device 1106, or memory on processor 1102.

The high speed controller 1108 manages bandwidth-intensive operations for the computing device 1100, while the low speed controller 1112 manages lower bandwidth-intensive operations. Such allocation of functions is exemplary only. In one implementation, the high-speed controller 1108 is coupled to memory 1104, display 1116 (e.g., through a graphics processor or accelerator), and to high-speed expansion ports 1110, which may accept various expansion cards (not shown). In the implementation, low-speed controller 1112 is coupled to storage device 1106 and low-speed expansion port 1114. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented as a standard server 1120, or multiple times in a group of such servers. It may also be implemented as part of a rack server system 1124. In addition, it may be implemented in a personal computer such as a laptop computer 1122. Alternatively, components from computing device 1100 may be combined with other components in a mobile device (not shown), such as device 1150. Each of such devices may contain one or more of computing device 1100, 1150, and an entire system may be made up of multiple computing devices 1100, 1150 communicating with each other.

Computing device 1150 includes a processor 1152, memory 1164, an input/output device such as a display 1154, a communication interface 1166, and a transceiver 1168, among other components. The device 1150 may also be provided with a storage device, such as a microdrive or other device, to provide additional storage. Each of the components 1150, 1152, 1164, 1154, 1166, and 1168, are interconnected using various buses, and several of the components may be mounted on a common motherboard or in other manners as appropriate.

The processor 1152 can execute instructions within the computing device 1150, including instructions stored in the memory 1164. The processor may be implemented as a chipset of chips that include separate and multiple analog and digital processors. The processor may provide, for example, for coordination of the other components of the device 1150, such as control of user interfaces, applications run by device 1150, and wireless communication by device 1150.

Processor 1152 may communicate with a user through control interface 1158 and display interface 1156 coupled to a display 1154. The display 1154 may be, for example, a TFT LCD (Thin-Film-Transistor Liquid Crystal Display) or an OLED (Organic Light Emitting Diode) display, or other appropriate display technology. The display interface 1156 may comprise appropriate circuitry for driving the display 1154 to present graphical and other information to a user. The control interface 1158 may receive commands from a user and convert them for submission to the processor 1152. In addition, an external interface 1162 may be provide in communication with processor 1152, so as to enable near area communication of device 1150 with other devices. External interface 1162 may provide, for example, for wired communication in some implementations, or for wireless communication in other implementations, and multiple interfaces may also be used.

The memory 1164 stores information within the computing device 1150. The memory 1164 can be implemented as one or more of a computer-readable medium or media, a volatile memory unit or units, or a non-volatile memory unit or units. Expansion memory 1174 may also be provided and connected to device 1150 through expansion interface 1172, which may include, for example, a SIMM (Single In Line Memory Module) card interface. Such expansion memory 1174 may provide extra storage space for device 1150, or may also store applications or other information for device 1150. Specifically, expansion memory 1174 may include instructions to carry out or supplement the processes described above, and may include secure information also. Thus, for example, expansion memory 1174 may be provide as a security module for device 1150, and may be programmed with instructions that permit secure use of device 1150. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1164, expansion memory 1174, or memory on processor 1152, that may be received, for example, over transceiver 1168 or external interface 1162.

Device 1150 may communicate wirelessly through communication interface 1166, which may include digital signal processing circuitry where necessary. Communication interface 1166 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1168. In addition, short-range communication may occur, such as using a Bluetooth, WiFi, or other such transceiver (not shown). In addition, GPS (Global Positioning System) receiver module 1170 may provide additional navigation- and location-related wireless data to device 1150, which may be used as appropriate by applications running on device 1150.

Device 1150 may also communicate audibly using audio codec 1160, which may receive spoken information from a user and convert it to usable digital information. Audio codec 1160 may likewise generate audible sound for a user, such as through a speaker, e.g., in a handset of device 1150. Such sound may include sound from voice telephone calls, may include recorded sound (e.g., voice messages, music files, etc.) and may also include sound generated by applications operating on device 1150.

The computing device 1150 may be implemented in a number of different forms, as shown in the figure. For example, it may be implemented as a cellular telephone 1180. It may also be implemented as part of a smart phone 1182, personal digital assistant, or other similar mobile device.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A non-transitory computer-readable storage medium comprising instructions stored thereon for propagating changes to copied text that, when executed by at least one processor, are configured to cause a computing system to at least:
monitor changes to text copied into multiple documents, the copied text having been copied from a previous document;
determine that a same deletion and different insertions have been made to the copied text in at least a threshold number of documents, the threshold number being greater than one; and
prompt the same deletion and a new insertion to be made to the copied text in a subsequent document based on the determination that the same deletion and different insertions have been made to the copied text in at least the threshold number of documents.

2. The non-transitory computer-readable storage medium of claim 1, wherein:
the instructions are further configured to cause the computing system to increment a change counter each time the same deletion is made to an instance of the copied text in a different document; and
the determining that the same deletion has been made to the copied text in at least the threshold number of documents includes comparing the change counter to the threshold number.

3. The non-transitory computer-readable storage medium of claim 1, wherein:
the copied text is presented in a user interface of the computing system;
the same deletion is made in the user interface to at least the threshold number of documents; and
the prompt is presented in the user interface.

4. The non-transitory computer-readable storage medium of claim 1, wherein the copied text is presented in a word processing application.

5. The non-transitory computer-readable storage medium of claim 1, wherein the copied text is presented in an email interface.

6. The non-transitory computer-readable storage medium of claim 1, wherein:
the same deletion and different insertions to the copied text includes deleting an original sequence of characters from the copied text; and
the prompting the same deletion and the new insertion to be made to the copied text in the subsequent document includes highlighting, in the subsequent document, the original sequence of characters.

7. The non-transitory computer-readable storage medium of claim 1, wherein the same deletion and different insertions to the copied text includes deleting an original sequence of characters from the copied text and inserting different new sequences of characters into the copied text.

8. The non-transitory computer-readable storage medium of claim 1, wherein the instructions are further configured to cause the computing system to determine that the same deletions and different insertions were changes to a noun in the copied text.

9. A non-transitory computer-readable storage medium comprising instructions stored thereon for propagating changes to copied text that, when executed by at least one processor, are configured to cause a computing system to at least:
monitor changes to text copied into multiple documents, the copied text having been copied from a previous document;
determine that a same deletion and different insertions have been made to the copied text in at least a threshold number of documents, the threshold number being greater than one;
determine that the same deletion and different insertions were changes to a proper noun in the copied text; and
prompt the same deletion and a new insertion to be made to the proper noun in the copied text in a subsequent document based on the determination that the same deletion and different insertions have been made to the copied text in at least the threshold number of documents.

10. The non-transitory computer-readable storage medium of claim 9, wherein the prompting the same deletion and the new insertion to be made to the proper noun in the copied text in the subsequent document includes highlighting, in the subsequent document, the proper noun in the copied text.

11. A method performed by a computing system, the method comprising:
monitoring deletions and insertions to copied text in multiple documents, the copied text having been copied from a previous document;
determining that a same deletion and different insertions have been made to the copied text in at least a threshold number of documents, the threshold number being greater than one; and
prompting the same deletion and a new insertion to be made to the copied text in a subsequent document based on the determination that the same deletion and different insertions have been made to the copied text in at least the threshold number of documents.

12. The method of claim 11, further comprising:
incrementing a change counter each time the same deletion and different insertion are made to the copied text in a different document,
wherein the determining that the same deletion and different insertion have been made to the copied text in at least the threshold number of documents includes comparing the change counter to the threshold number.

13. The method of claim 11, wherein:
the copied text is presented in a user interface of the computing system;
the same deletion and different removal are made in the user interface at least the threshold number of times; and
the prompt is presented in the user interface.

14. The method of claim 11, wherein the copied text is presented in multiple documents of a word processing application.

15. The method of claim 11, wherein the copied text is presented in multiple documents of an email interface.

16. The method of claim 11, wherein:
the same deletion and different insertions in copied text includes deleting an original sequence of characters from the copied text; and
the prompting the same deletion and the new insertion to be made to the copied text in the subsequent document includes highlighting, in the subsequent document, the original sequence of characters.

17. The method of claim 11, wherein the same deletion and different insertions to the copied text includes deleting an original sequence of characters from the copied text and adding different new sequences of characters to the copied text.

18. The method of claim 11, further comprising determining that the same deletion and different insertion were changes to a noun in the copied text.

19. The method of claim 11, further comprising determining that the same deletion and different insertions were a change to a noun in the copied text.

20. A computing system comprising:
at least one processor; and
a non-transitory computer-readable storage medium comprising instructions stored thereon that, when executed by the at least one processor, are configured to cause the computing system to at least:
monitor changes to text copied into multiple documents, the copied text having been copied from a previous document;
determine that a same deletion and different insertions have been made to the copied text in at least a threshold number of documents, the threshold number being greater than one; and
prompt the same deletion and a new insertion to be made to the copied text in a subsequent document based on the determination that the same deletion and different insertions have been made to the copied text in at least the threshold number of documents.

21. The computing system of claim 20, wherein the copied text is presented in an email interface.

22. The computing system of claim 20, wherein:
the same deletion and different insertions to the copied text include removing an original sequence of characters from the copied text; and
the prompting the same deletion and the new insertion to be made to the copied text in the subsequent document includes highlighting, in the subsequent document, the original sequence of characters.

23. The computing system of claim 20, wherein the same deletion and different insertions to the copied text in the subsequent document include deleting an original sequence of characters from the copied text and inserting different new sequences of characters into the copied text.

* * * * *